(12) United States Patent
Karasch

(10) Patent No.: US 10,590,370 B2
(45) Date of Patent: Mar. 17, 2020

(54) APPARATUS AND METHOD FOR AGING LIQUIDS

(71) Applicant: Russell D. Karasch, Osage, MN (US)

(72) Inventor: Russell D. Karasch, Osage, MN (US)

(*) Notice: Subject to any disclaimer, the term of this patent is extended or adjusted under 35 U.S.C. 154(b) by 186 days.

(21) Appl. No.: 15/170,267

(22) Filed: Jun. 1, 2016

(65) Prior Publication Data

US 2016/0355772 A1 Dec. 8, 2016

Related U.S. Application Data

(63) Continuation-in-part of application No. 14/545,887, filed on Jun. 26, 2015, now abandoned, which is a continuation-in-part of application No. 14/225,992, filed on Mar. 26, 2014, now abandoned, which is a continuation-in-part of application No. 13/065,944, filed on Apr. 1, 2011, now Pat. No. 9,212,343.

(60) Provisional application No. 61/343,510, filed on Apr. 30, 2010.

(51) Int. Cl.
*C12H 1/22* (2006.01)
*C12G 3/07* (2006.01)

(52) U.S. Cl.
CPC .......... *C12H 1/22* (2013.01); *C12G 3/07* (2019.02)

(58) Field of Classification Search
CPC .................................. C12H 1/22; C12G 3/065
USPC ............................ 99/277.1; 217/4, 72, 88, 91
See application file for complete search history.

(56) References Cited

U.S. PATENT DOCUMENTS

| | | | |
|---|---|---|---|
| 273,860 A | 3/1883 | Lachenmeyer |
| 334,222 A | 1/1886 | Fitch |
| 429,826 A | 6/1890 | Wagoner |
| 818,478 A | 4/1906 | Shwayder |
| 1,919,091 A | 10/1934 | Pritchett |
| 2,017,235 A | 10/1935 | Drew |
| 2,064,330 A | 12/1936 | Yocum |
| 2,079,378 A | 5/1937 | Mills |
| 2,086,073 A | 7/1937 | Francescon |
| 2,105,693 A | 1/1938 | Jones et al. |
| 2,108,661 A | 2/1938 | Farrier |
| 2,114,009 A | 4/1938 | Ramsay |
| 2,195,662 A | 4/1940 | Van Sant |
| 2,203,229 A | 6/1940 | Nilsson et al. |
| 2,289,245 A | 7/1942 | Dant |
| 2,487,594 A | 11/1949 | Rudnick |

(Continued)

OTHER PUBLICATIONS

Fine Northern Oak website: www.finenorthernoak.com.

*Primary Examiner* — Thien S Tran
(74) *Attorney, Agent, or Firm* — Gregor N. Neff

(57) ABSTRACT

A rectangular or cylindrical container made of stainless steel or another liquid-impervious material has a plurality of openings formed in the side wall(s). Wooden boards, made of white oak or other wood for aging and flavoring beverages, are fitted over the openings and sealed so that their inside surfaces contact the liquid in the container. The inside surfaces have cross-grain cuts such as saw cuts or holes, which are used to enhance the infusion of beverage liquid into the wood to age the beverage rapidly and flavorfully. When one batch is finished, the used boards are removed and new ones are fitted into the openings and used to treat another batch. Instead of, or in addition to the boards over the side-wall openings, hollow wooden air boxes having external cross-grain cuts are positioned in the container.

6 Claims, 5 Drawing Sheets

(56) References Cited

U.S. PATENT DOCUMENTS

| | | | |
|---|---|---|---|
| 2,876,692 A | 3/1959 | Gaisman | |
| 3,372,633 A | 3/1968 | Horlander, Jr. | |
| 3,462,038 A | 8/1969 | Morris | |
| 3,842,723 A | 10/1974 | Boucher | |
| 3,942,423 A | 3/1976 | Herzfeld | |
| 4,093,099 A | 6/1978 | Spooner | |
| 4,173,656 A | 11/1979 | Duggins | |
| 4,322,446 A | 3/1982 | Heess et al. | |
| 4,484,688 A | 11/1984 | Smith | |
| 4,558,639 A | 12/1985 | Hojnoski | |
| 4,703,866 A | 11/1987 | Scott | |
| 4,953,730 A * | 9/1990 | Prime | B65D 15/22 217/13 |
| 5,054,381 A | 10/1991 | DePeaux et al. | |
| 5,102,675 A | 4/1992 | Howell et al. | |
| 5,174,461 A | 12/1992 | Sullivan | |
| 5,481,960 A | 1/1996 | Sullivan | |
| 5,537,913 A | 7/1996 | Vowles | |
| D372,624 S | 8/1996 | Chein | |
| 5,647,268 A | 7/1997 | Sullivan | |
| 6,041,954 A * | 3/2000 | Savioz | B65D 88/10 217/4 |
| D422,678 S | 4/2000 | King | |
| 6,203,836 B1 | 3/2001 | Gross, II et al. | |
| 6,378,419 B1 | 4/2002 | Eckleln | |
| D476,058 S | 6/2003 | Norton | |
| D506,109 S | 6/2005 | Deal et al. | |
| 6,966,250 B2 | 11/2005 | Eustis | |
| 7,357,069 B1 | 4/2008 | Karasch et al. | |
| D584,564 S | 1/2009 | Karasch | |
| 7,594,468 B2 | 9/2009 | Kania et al. | |
| 7,866,254 B1 | 1/2011 | Karasch et al. | |
| 8,889,206 B2 | 11/2014 | Lix | |
| 2003/0157216 A1 | 8/2003 | Plumb | |
| 2005/0031760 A1 | 2/2005 | Plumb | |
| 2007/0000929 A1* | 1/2007 | Fernandez | B65D 15/22 220/565 |
| 2009/0050631 A1* | 2/2009 | Redmond | B65D 77/0466 220/565 |
| 2010/0025396 A1* | 2/2010 | Boake | B65D 15/16 220/4.09 |
| 2010/0065466 A1* | 3/2010 | Perkins | B65D 19/385 206/600 |

* cited by examiner

APPARATUS AND METHOD FOR AGING LIQUIDS

This invention relates to the aging of liquids such as wine, spirits, beer, and other liquids: syrups, and the like, whose flavors are enhanced by aging in wood.

Many proposals have been made in the past for aging liquids in wood. The main problem addressed by such prior proposals, and by this invention as well, is the very slow speed at which aging in oaken barrels takes place. Often, it takes years of aging to create a whiskey, wine, or other spirituous liquid with the right flavor characteristics. This is very expensive because of the capital tied up in barrels, storage space, and evaporation of the liquid.

Therefore, there have been many attempts to provide apparatus and methods to accelerate the aging process. In one prior approach, wood is cut into small cubes or shavings, etc. and placed in a bag or other porous container which then is inserted into the liquid. This requires cutting the wood, bagging it, and the cost of bags. It has other disadvantages which will be set forth below.

Other prior aging processes and apparatus include the formation of vertical grooves or indentations in the staves of a wooden barrel to increase the surface contact area of the barrel. This is believed to produce an only modest improvement, at best.

Other prior devices use structures such as wooden discs or spiral-cut wooden pieces to be inserted into the liquid to increase the wood surface area and accelerate aging.

My U.S. Pat. No. 9,212,343 provides a very satisfactory solution to these problems by providing a plurality of cross-grain cuts in the wood of the staves forming the side-wall of a barrel. This accelerates the aging of the liquid in the barrel and imparts excellent flavor to the wood. The cross-grain cuts preferably take the form of saw cuts and/or arrays of holes cut part-way through the wood. Flavor sticks having similar cross-grain cuts also are described.

Another problem with which this invention is concerned is caused by the shape and the construction of the standard oak barrel used for aging spirituous liquids. Such barrels, with their many staves bent outwardly in the middle, and their metal hoops are expensive to make and require substantial amounts of warehouse space for storage while the liquids are aging in the barrels. Furthermore, the standard barrels are relatively difficult to handle because of their shape.

The foregoing problems have been recognized for a very long time, but have not been solved satisfactorily.

One frequently-suggested solution is to make the barrels rectangular in shape instead of round with bulging sides. However, this suggestion has met with little or no success, for a variety of reasons.

Accordingly, it is an object of this invention to provide a container for aging liquids which provides rapid aging and has a generally rectangular shape, which is relatively easy to move on standard pallets, and requires relatively much less storage space than standard barrels.

Another problem addressed by the present invention is that there is a shortage of certain woods, such as white oak, used in making wooden barrels for the storage and aging of beverages. Also, such wood, when available, is relatively expensive.

Furthermore, the wood shortage and the effective total cost of containers for aging certain beverages is greatly increased by the fact that wooden barrels often cannot be used more than once, either by law or by normal quality control standards for the beverages.

Therefore, it is another object of the invention to provide an aging container and method which minimizes the amount of wood it or the beverage producer uses, without losing the benefit of the fast aging, good flavor, and other beneficial effects of aging beverages in wood.

In accordance with the present invention, the foregoing objects are met by the provision of a liquid beverage aging container which is made of a liquid-impervious material other than wood, such as stainless steel, with one or more wooden boards or panels with cross-grain cuts in one surface contacting the liquid, with the opposite surface of each panel contacting the atmosphere to assure microoxygenation of the liquid.

In one preferred embodiment, the wood panels cover openings in the side wall of the container, with the panel surface bearing the cross-grain cuts facing into the interior of the container and the opposite surface facing outwardly in contact with the surrounding atmosphere.

In another embodiment, wood panels form one or more "air boxes", with cross-grain cuts in the outside surfaces and a hollow interior. The air boxes are immersed in the liquid to be aged, while the inside surfaces of the panels forming the boxes contact the atmosphere in the hollow interior to create microoxygenation. The air boxes can be used either alone, or in addition to panels covering openings in the side wall of the container to increase the rapid aging capabilities of the container.

Preferably, the container is generally rectangular in shape, with flat side walls. Recesses or flanges are provided at the bottom edge of the container to receive the top edge of another like container so that the containers can be stacked with stability for compact storage.

Because the container is made mostly of a liquid-impervious material, such as stainless steel, plastic or the like, the container can be re-used many times, simply by replacing the wood panels with new ones. The panels are relatively small, and moderate in manufacturing cost, with the result that there is a great saving in wood, and there is a substantial saving in total container cost for the beverage producer.

If the shape of the container is rectangular, there also is a substantial saving in Handling costs and warehouse space for storing the containers, during the aging process or when standing by for future use.

The foregoing and other objects and advantages of the invention will be set forth in or apparent from the following specification and drawings.

IN THE DRAWINGS

WOOD-SAVING CONTAINER

Figure 1:
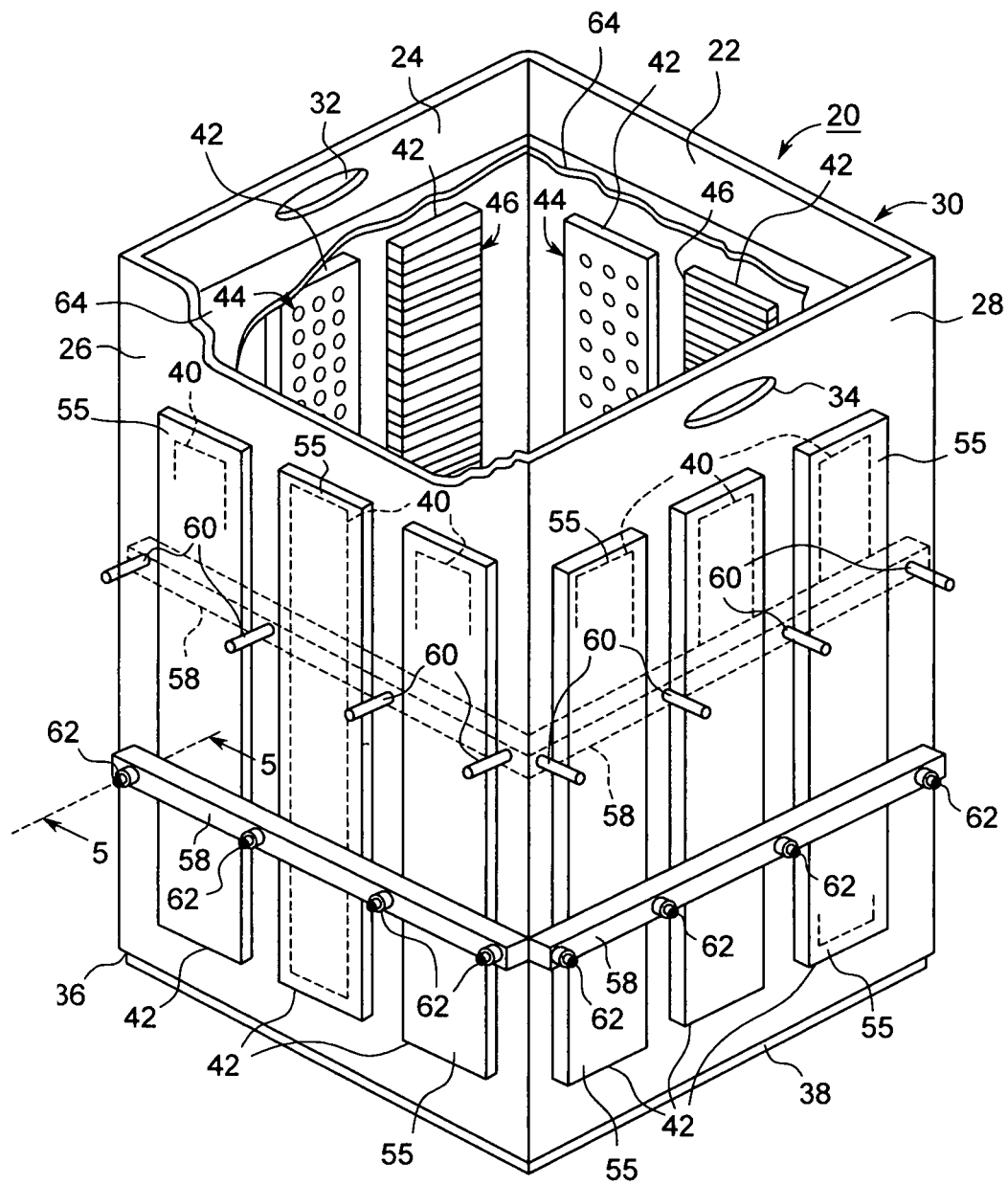
FIG. 1 is a perspective, partially broken-away view of one embodiment of the invention.

FIG. 1 shows an embodiment 20 of the container of the invention that requires far less wood than other prior barrels made entirely or mostly of wood.

The container is made of a material, other than wood, that is impervious to liquids and has good structural strength. Stainless steel is preferred, but other metals or plastics or glass can be use instead, in certain circumstances.

Figure 2:
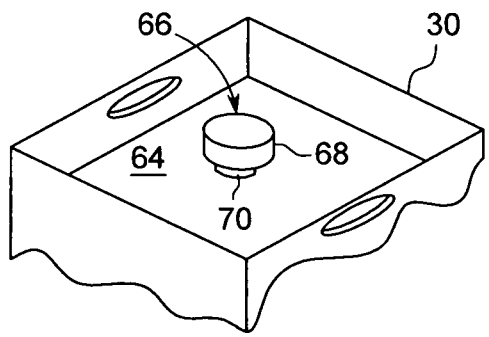
FIG. 2 is a perspective view, with the bottom broken away, of the top of the structure shown in FIG. 1.
Figure 6:
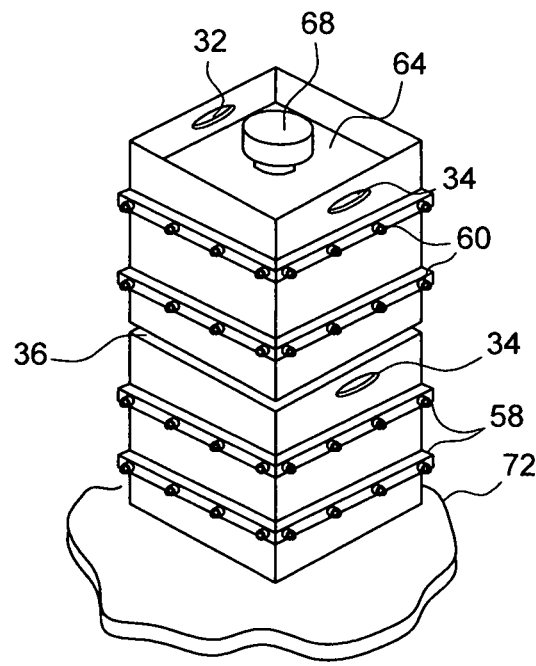
FIG. 6 is a perspective, partially-schematic view of two of the containers of FIG. 1 stacked one on top of the other for compact storage.

The container has four flat side-walls, 22, 24, 26, and 28, a top wall 64, and a bottom wall at reference numeral 38, which preferably are welded or otherwise attached to the side walls. The top wall 64 (FIGS. 1 and 2) is recessed below the upper edges 30 of the side-walls by a distance higher than the top of an upstanding bung-hole structure 66 (consisting of a tube 70 and cap 68) through which the container is filled and emptied. The extensions of the upper edges 30 of the side walls protect the bung-hole structure against damage, and facilitate the stacking of the containers atop one another, as shown in FIG. 6. A groove 36 around the bottom edge of the container provides a recess into which the top edges of the side walls will fit to nest the containers so that they can be stacked atop one another with good stability.

Hand-holes are provided at 32 and 34 for use in lifting the container.

In each of the side-walls there are three elongated vertical rectangular holes 40, shown in dashed lines. Inserted through and covering each of the holes 40 is a board 42 made of a wood desirable for the process of aging a particular beverage. White oak is one of the most widely used and scarce woods at the present time.

Figure 3:
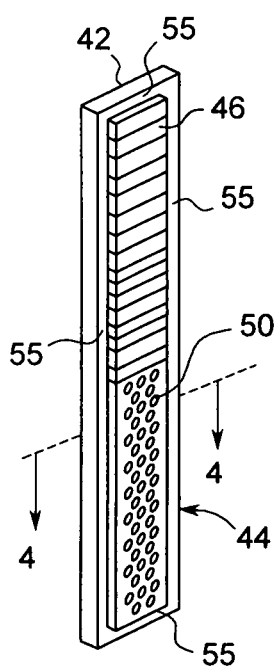
FIG. 3 is a perspective view of a component of the FIG. 1 structure.
Figure 4:
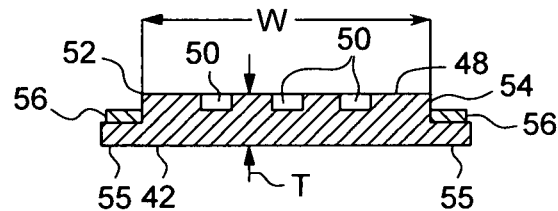
FIG. 4 is a cross-sectional view, taken along line 4-4 of FIG. 3.

As shown in FIGS. 3 and 4, each board has an inner surface 48 (FIG. 4) which makes contact with the liquid in the container. The board has longitudinal grooves 52 and 54 in opposite edges and both ends of the board so as to form a continuous flange 55 around the entire periphery of the board. The width "W" and the length of the inner surface of the board are slightly smaller than the corresponding dimensions of the holes 40 in the side walls so that the boards can be inserted into the holes easily. A gasket 56 is provided around the periphery of each board so as to cover the flange 55 and to provide a liquid-tight seal between the board and the side-wall when the board is pressed against the side-wall edges at the openings 40.

Three individual holes 50 are shown in FIG. 4.

As it is shown in FIGS. 3 and 1, each of the inner surfaces of the boards has a plurality of cross-grain cuts such as the horizontal linear cuts 46 and/or hole arrays 44, such as the staggered hole array shown in FIG. 4 of and described in detail in my U.S. Pat. No. 9,212,343. The number and type of cross-grain cuts is selected to provide the degree and speed of infusion and flavor characteristics desired for the beverage being produced. Although some of the boards may not have any cuts, most or all usually will have cuts so as to maximize the aging process.

Figure 5:
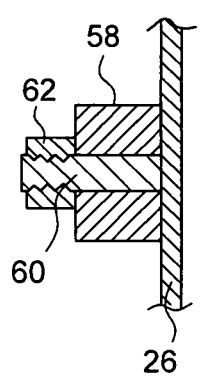
FIG. 5 is a cross-sectional view taken along line 5-5 of FIG. 1.

A clamping structure is used to hold the boards 42 in place. The clamping structure consists of a plurality of threaded studs 60 extending from the outside surfaces of the side walls, and a plurality of holding bars 58, some of which are shown in dashed lines in FIG. 1. The bars 58 preferably are made of stainless steel and have holes through which the threaded studs pass. As it is shown in FIG. 5, a threaded nut 62 is threaded on to the threaded end of each stud, and is tightened to the degree necessary to make the container liquid-tight. The gasket 56 preferably is made of an alcohol-resistant sealing material such as an expanded PTFE plastic material which provides an excellent seal.

When the panels 42 have been bolted in place by use of the bars 58, the container 20 can be filled with liquid and sent to storage where the aging process is allowed to continue until the beverage inside has the desired characteristics.

As shown in FIG. 6, the rectangular containers can be stacked atop one another on a support floor 72, and gain the advantages described above for rectangular containers.

The wood-saving advantages of the container 20 not only include saving wood in the making of the container, but also when it is time to age a new beverage batch. Instead of discarding the old container, one merely removes the old boards and replaces them with new ones, and fills the container with the new beverage. This not only saves wood, but it saves money, because the only materials cost is the relatively low cost of the new boards. Since the boards are relatively short, compared with barrel staves, some scrap wood may prove to be usable as boards 42.

Although quarter-sawed oak is preferred, flat-sawed oak might be usable for the boards or panels 42 because the aging time is so short and the boards 42 are so relatively small that flat-sawed oak might not cause unacceptably excessive evaporation.

The container 20 also has an advantage over the prior use of stainless steel tanks with "flavor sticks" in them. Since the wood panels 42 are exposed to the air, they "breathe" like the walls of ordinary barrels, and therefore provide good microoxygenation. This is a significant advantage in that microoxygenation is considered by many to be important in making the finest beverages.

Microoxygenation can be increased by reducing the thickness "T" (FIG. 4), and also by increasing the depth of the holes 50 or saw cuts 46. Conversely, it can be reduced by making the cuts shallower or the thickness "T" greater. The depth of the holes and linear cuts can be as great as desired, as long as the structural integrity of the panel is not compromised.

Many variations of the foregoing can be made without departing from the invention. For example, it is within the scope of the invention to provide a frame for mounting three of the boards and applying them simultaneously to three holes 40 to speed the installation procedure. The frame would remain as part of the holding structure. Alternatively, other known clamps can be used to hold the boards firmly in place.

Reversed Panel Embodiment

Figure 7:
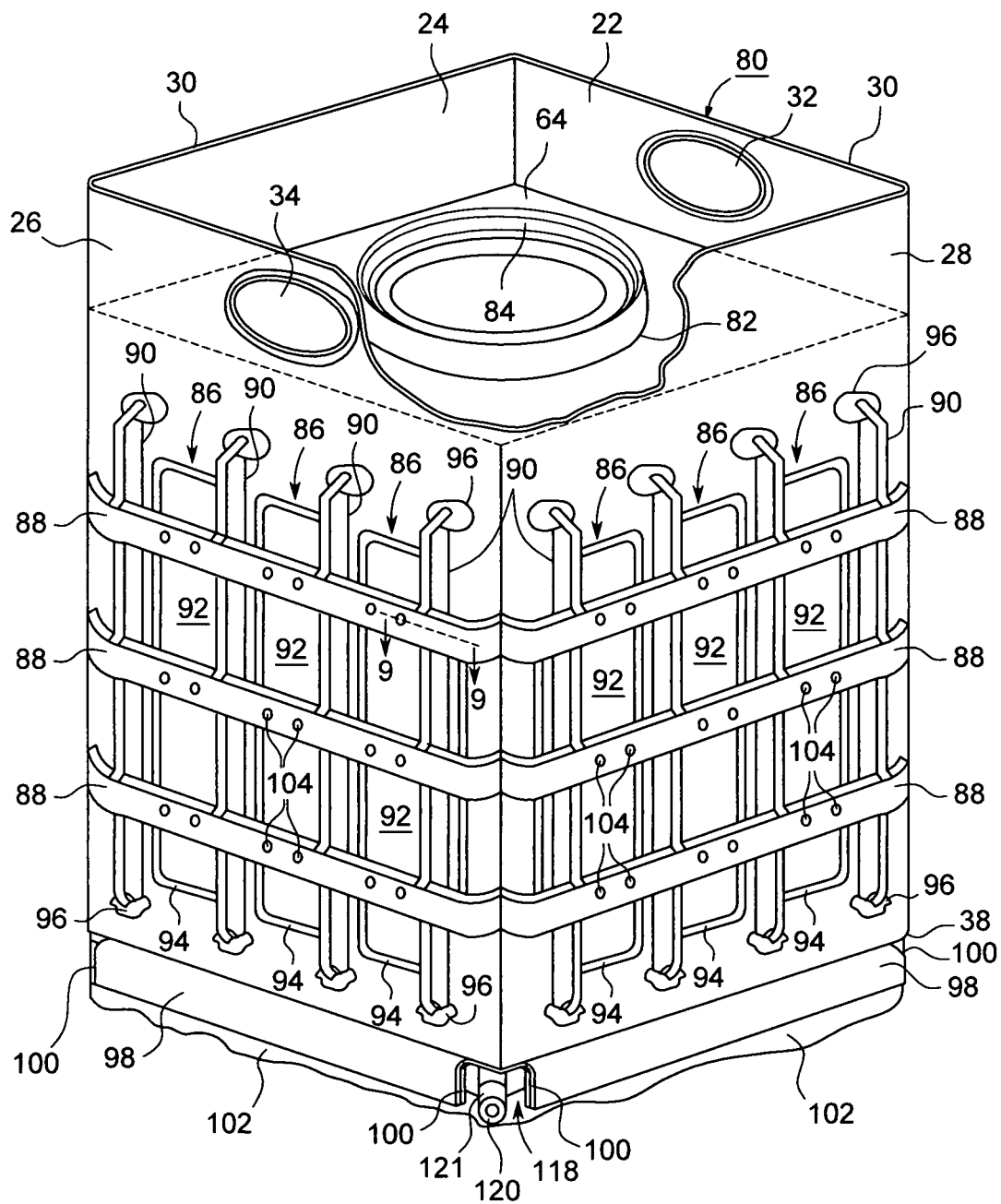
FIG. 7 is a perspective, partially broken-away view of another embodiment of the invention.
Figure 9:
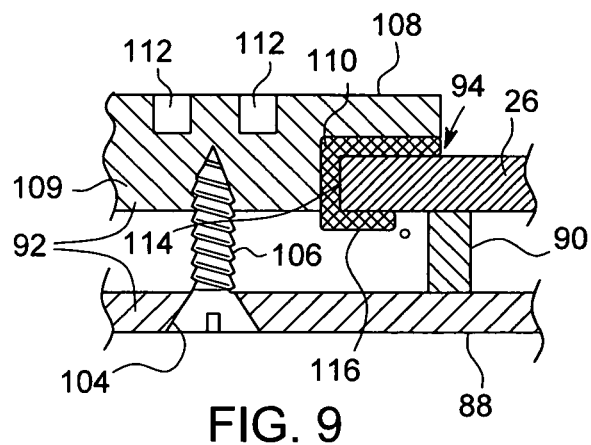
FIG. 9 is a cross-sectional, broken-away view taken along line 9-9 of FIG. 7.
Figure 11:
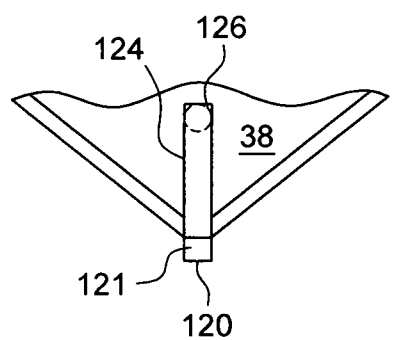
FIG. 11 is a bottom plan view, partly broken away, of the bottom of the container of FIG. 7.

FIGS. 7, 9 and 11 show another aging container 80 which is similar to the unit 20 shown in the prior drawing figures. Corresponding parts of the different containers are given the same reference numerals in the drawings.

One of the main differences between the containers 20 and 80 is that the boards or panels 92 in the FIG. 7 unit are reversed from the panels 42 in FIG. 1. That is, the flange 55 (FIG. 4) of the panels 42 is on the outside of the container 20, whereas the flange 108 (FIG. 9) of the panels 92 is inside the container 80. This has several advantages.

One advantage is that the force applied to the panel by the weight of the liquid tends to push the flange of the panel against the gasket 94 (FIG. 9) and the container side wall and thus minimize the chances of leakage.

Another advantage is in allowing the use of a simpler, less costly and functionally improved system for securing the panels in place.

A further advantage is in increasing the surface area of the panels that contacts the liquid, thus increasing the amount of wood end-grain available for rapid infusion.

The securing system includes a plurality of cross-bars 88 welded at their ends to the side wall near the vertical corners of the container. There are three cross-bars 58 traversing the panels on each of the four sides of the container. Each cross-bar 58 has two holes 104 located over each of the panels 92 it traverses.

On each of the four sides of the container are four vertical bars or "spines" 90 which are welded at each of its ends as at 96 to the side wall 26 or 28, etc to extend perpendicularly from the side wall. Each of the spines is welded to each of the cross-bars 58 under which it passes, and there are two of the spines embracing each panel 92.

The vertical spines serve at least two purposes. First, they stiffen the side-walls to minimize their unwanted flexing that might cause leakage between the panels 92 and the side wall of the container. Secondly, they provide strong spacers to space the cross-bars from the panels 92 and their gaskets 94 (FIGS. 7 and 9), again to minimize flexure and leakage, and, with the cross bars, to provide a strong support to hold the panels 92 firmly in place.

Referring now to FIG. 9, the gasket 94 is generally U-shaped in cross-section, with a long flange 110, a shorter flange 116, and an intermediate section 114. The seal embraces the edge of the side wall all the way around the periphery of the opening 86 in the side wall, and the long flange 110 fits under the flange 108 around the periphery of the panel 92. Preferably, the size of the central part of the panel 92 that fills the opening 86 is such that there is a slight interference fit with the gasket 94 when the central part of the panel is pushed into the opening.

The material of which the gasket is made is one suitable for use without deterioration in contact with spirituous liquids such as alcoholic beverages. One such material is polypropylene with a hardness of around 40 to 45 durometer.

To secure the panel 92 in place, wood screws 106 are inserted through the countersunk holes 104, inserted into pre-drilled pilot holes (not shown) in the central section of the panels 92, and driven in. Thus, there are six screws which pull each panel against its gasket to provide a sure, leak-free mounting for each panel.

In order to enable the installation of the panels 92, a relatively large bung-hole structure 82 is provided. Its diameter is at least large enough to allow a human hand and arm to be inserted into the container, with or without a panel in hand, and reach the side wall to insert and hold the panels in place while the screws 106 are driven from the outside of the container.

The bung hole 82 has internal screw threads 84. A large threaded closure cap (not shown) is used to close the hole, to prevent leakage of the beverage from the container. Of course, the hole 82 can be used in the usual way to empty or fill the container.

When it is desired to remove the panels, after use in aging a batch of beverage, for example, the above installation process is reversed. The bung cap is removed, the screws 106 are removed, and each panel is removed and replaced with a new panel. Thus, the beverage batch has been aged quickly and with good microoxygenation by use of the panels, which were exposed to the ambient atmosphere, like standard wooden barrels are.

The amount of wood used in the process is much less than if a whole barrel had to be replaced with a new one.

Nesting

Nesting of the containers is facilitated by the use of bent bottom flanges 98 (FIG. 7) welded along each of the four bottom edges of the container. The flanges 98 extend outwardly and downwardly from the side wall. They are dimensioned so that they receive and hold the upper edge of a like container shown schematically at 102 in FIG. 7. The flanges 98 do not extend the full length of each side so that there is a gap 118 between adjacent ends 100 of the flanges 98.

Drain and Sample Pipe

The dimensions of the bottom flanges are such that there is a vertical space between the bottom of the upper container and the upper edge of the lower container. This space is put to use to locate a drain or sampling pipe 124 (FIG. 11) extending from a drain hole 126 in the bottom of the upper container to an outlet 120 extending out of the gap 118. A valve shown schematically at 121 is provided to allow manual opening of the drainpipe to allow sampling of the beverage during aging, or to empty the container, all without having to unstack the containers.

When the container sits on a flat surface, it rests on the flanges 98, which now are used as feet. These feet provide space between the bottom of the container and the floor for the drainpipe to protect it from damage by contact with the floor, as well as contact with the top edge of the lower container when stacked.

Air-Box Embodiments

Figure 8:
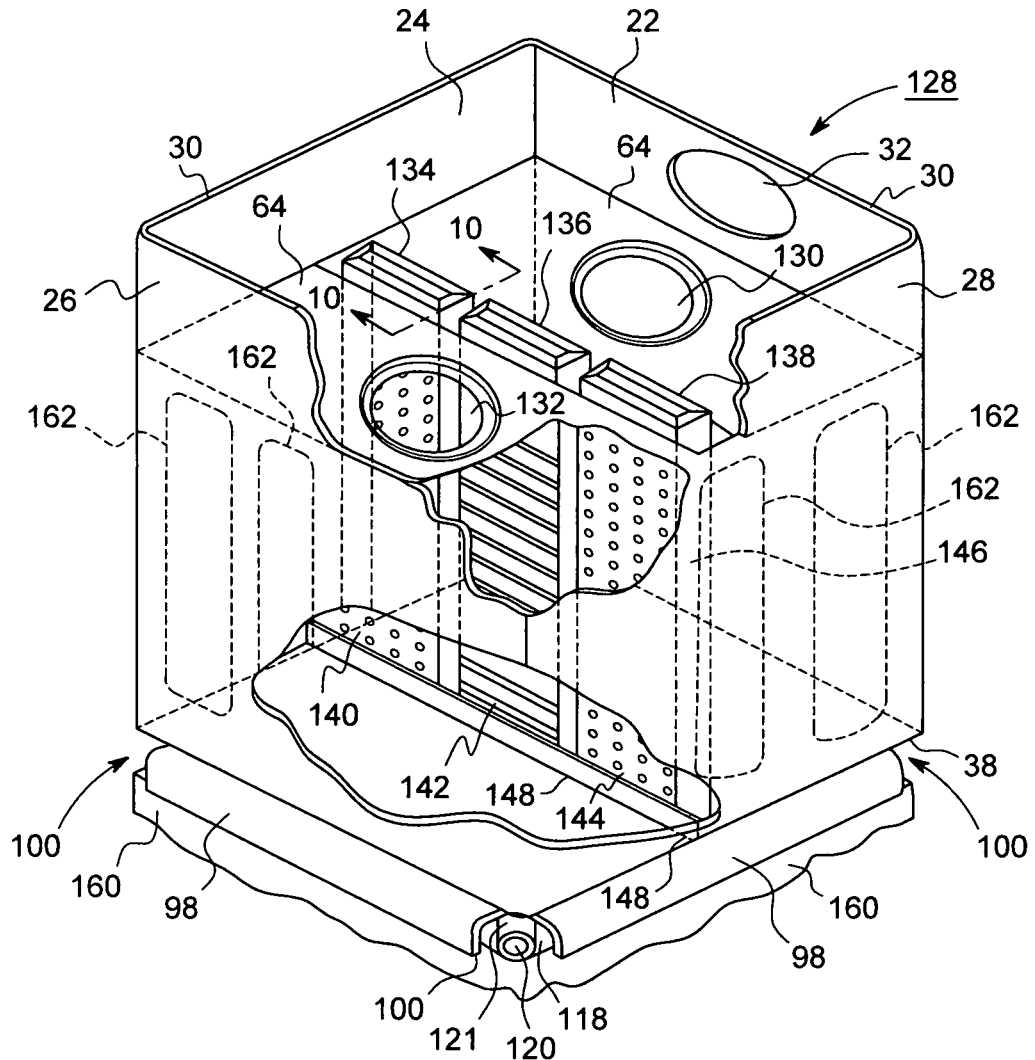
FIG. 8 is a perspective, partially broken-away view of another embodiment of the invention.
Figure 10:
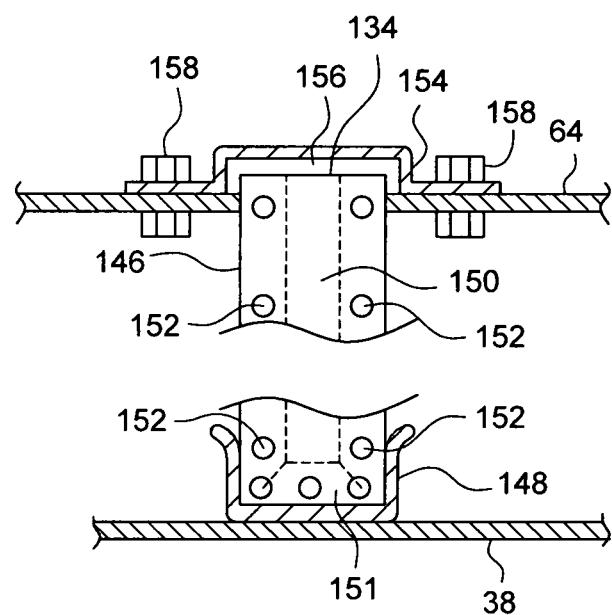
FIG. 10 is a cross-sectional, broken-away view taken along line 10-10 of FIG. 8.

FIGS. 8 and 10 show a further embodiment of the invention which is referred to herein, for the sake of convenience, as the "air-box" embodiment, which uses one or more hollow, gas-filled liquid-tight wooden boxes immersed in the liquid to be aged in a container 128 made of stainless steel or other non-wooden material. The boxes have cross-grain cuts in their outer surfaces, so that they age, flavor and microoxygenate the liquid.

FIG. 8 represents two different embodiments; a first one, in which the container 138 has no source of aging action other than the air boxes, and a second one that has wood panels in the side walls in addition to the air boxes, thus giving enhanced processing capability to enable processing beverages in larger containers. The second of these embodiments is represented in FIG. 8 by additional panels and securing structures of either FIG. 1 or FIG. 7 indicated schematically at 162.

The hollow space in each air box is indicated at 150 in FIG. 10. The space is narrow in contrast to the width of the boards or panels forming the boxes. This is to minimize the volume the boxes occupy and leave more room for beverage in the container.

The volume of gas contained in the hollow interiors of the boxes is believed to be adequate to provide ample microoxygenation when it is filled with ordinary air. However, it can be filled with oxygen-enhanced air, if desired.

Each of the air boxes consists of a pair of panels 140, 142, or 144, (only one being shown in FIG. 8) with narrow end pieces 146 (FIG. 10) and a bottom piece 151 joined to the panels at tongue-and-groove joints, with screws 152 driven into the joints to form liquid-tight boxes. Both panels of each box have cross-grain cuts.

The air boxes are mounted in a channel member welded to the bottom 38 of the container 128, and the open tops 134 of the boxes extend upwardly through a slot in the top wall 64, and a cap 154 with a gasket 156 is secured to the top 64 by fasteners 158 and covers the tops of the boxes to prevent liquid from entering them. The boxes are spaced apart from one another to allow some circulation of liquid in the container. The cap 154 is shaped to cover all parts of the slot in the top wall 64 to prevent leakage.

If microoxygenation of the beverage otherwise is sufficient, then simple panels with cross-grain cuts can be used instead of hollow boxes.

Two large bung holes 130 and 132 like the structure 82 shown in FIG. 7 are shown in FIG. 8 to permit access for the hand and arm of someone to remove and replace the side panels, in the embodiment in which both side panels such as those shown in the FIG. 7 embodiment and air boxes are used. In an embodiment in which side panels like those in FIG. 1 are used, or in which there are no side panels, a single bung hole of normal size will suffice.

In the FIG. 8 structure, bottom flanges 98 are used, as in the FIG. 7 structure, to fit over the top edge of another like container, indicated schematically at 160, for stable stacking and compact storage. An optional drainpipe structure 120 like that shown for the FIG. 7 embodiment also is shown in FIG. 8.

Although other materials can be used, the preferred material for the containers is stainless steel, such as No. 304 alloy. This applies to the walls of the containers, the securing structures, and the fasteners.

The wood of which the panels and air boxes are made depends upon the beverage being aged. It often will be white oak, but can be any other wood used in aging beverages.

I claim:

1. A container for storing and aging beverages, said container comprising, in combination,
   (a) at least one side wall, a bottom wall, and a top wall, all made of liquid-impervious material, said top wall and said bottom wall being secured to said side wall at joints made of solid liquid-impervious material to form a liquid-tight container,
   (b) said side wall having a plurality of spaced-apart openings, each of said openings and said side wall having an area, the area of each of said openings being less than the area of said side wall,
   (c) a plurality of individual wooden boards, each having a size and shape to completely cover one of said openings and being positioned to cover one of said openings and forming a liquid-tight seal with said side wall,
   (d) a securing structure releasably holding said boards in liquid-tight-sealing relationship to said side wall, in which a liquid, when present in said container, applies pressure to said side wall,
   (e) in which each of said boards is located inside said container and has a breadth wider than the opening that it covers so that the pressure applied to said board by liquid in said container tends to push said board towards said side wall and seal said opening.

2. A container as in claim 1 in which each of said openings has an edge, and said side wall has an inside and an outside surface, including a gasket around each of said edges on said inside surface of said side wall, and in which said securing structure includes a plurality of crossbars secured to said outside surface of said side wall and traversing said openings, and fasteners connecting each of said boards from its outside surface to at least one of said crossbars and pulling said boards towards said crossbar and against said gasket on said inside surface of said side wall.

3. A container as in claim 2 in which said gasket has an inner portion inside said container, said inner portion covering the inside surface of said side wall around said opening, said board having a relatively thick central section shaped like said opening with an outer thinner flange extending beyond the outside edge of said central section, said central portion of said board being sized and shaped to fit into said opening with said gasket in place, with said flange contacting said inner portion of said gasket, and said top wall of said container having a closable opening of a size sufficient to provide access to the inside of said container for installing said boards in or removing them from said openings.

4. A container as in claim 1 in which said side wall comprises a plurality of substantially flat sections, each having side edges, bottom edges, and top edges, said sections being secured together and to said top and bottom walls, said container being rectilinear in shape, in which said bottom wall has four outer edges, and including a flange extending downwardly from each of said outer edges and sized to receive and hold the top edges of a like container to facilitate nesting and stacking of said containers.

5. A container as in claim 4 in which said flanges are shaped and dimensioned to support the upper one of two stacked containers with a space between said upper container and the upper edge of the bottom container, said flanges having at least one exit opening from said space, a drain hole in said bottom wall, and a drain pipe extending from said drain hole through said exit opening, and a valve operable from outside of said container to selectively remove the liquid from said container through said drain pipe.

6. A container as in claim 1 in which each of said boards has an inside surface and an outside surface when positioned to cover one of said openings, and said inside surface of at least one of said boards has a plurality of cross-grain cuts exposed to a liquid in said container.

* * * * *